United States Patent [19]

Pillis et al.

[11] Patent Number: 4,556,638

[45] Date of Patent: * Dec. 3, 1985

[54] MICROORGANISM CAPABLE OF DEGRADING PHENOLICS

[75] Inventors: Lewis J. Pillis, Roanoke; Lois T. Davis, Salem, both of Va.

[73] Assignee: Sybron Corporation, Rochester, N.Y.

[*] Notice: The portion of the term of this patent subsequent to May 8, 2001 has been disclaimed.

[21] Appl. No.: 524,631

[22] Filed: Aug. 19, 1983

Related U.S. Application Data

[63] Continuation of Ser. No. 372,775, Apr. 28, 1982, Pat. No. 4,447,539, which is a continuation of Ser. No. 229,025, Jan. 27, 1981, Pat. No. 4,352,886.

[51] Int. Cl.$^4$ ............................ C12N 1/20; C12R 1/40
[52] U.S. Cl. ..................................... 435/253; 435/877
[58] Field of Search ................................. 435/253, 877

[56] References Cited

U.S. PATENT DOCUMENTS 4,447,539  5/1984  Pillis et al. ........................... 435/877

Primary Examiner—Robert J. Warden
Assistant Examiner—William J. Herald
Attorney, Agent, or Firm—Sughrue, Mion, Zinn, Macpeak & Seas

[57] ABSTRACT

Mutant microorganism, Pseudomonas putida CB-173 degrading phenolics, and at a temperature as low as, e.g., about 1° to 4° C., at a faster rate than known Pseudomonas putida type strains, and process for treating wastewater containing phenolics using the mutant microorganism strain Pseudomonas putida CB-173.

1 Claim, No Drawings

MICROORGANISM CAPABLE OF DEGRADING PHENOLICS

This is a continuation of application Ser. No. 372,775, filed Apr. 28, 1982, now U.S. Pat. No. 4,447,539, which is a continuation of application Ser. No. 229,025 filed Jan. 27, 1981, now U.S. Pat. No. 4,352,886.

BACKGROUND OF THE INVENTION

1. Field of the Invention

This invention relates to a novel microorganism of the strain *Pseudomonas putida* which has an enhanced ability to degrade phenolics in industrial wastewater lagoons even at low temperature under aerobic conditions and to a process for treating wastewater to remove phenolics therefrom utilizing such microorganism strain.

2. Description of the Prior Art

Many producers and processing plants which use large amounts of water render this water unsuitable for reuse and undesirable for release into the biosphere due to the pollution problems which result when it is discharged untreated. Biological systems, such as aerated lagoons and activated sludge systems, are the generally accepted methods of processing these wastewaters prior to reuse or discharge to receiving bodies of water.

While biological processes occurring during such a biological treatment provide the ability, with most wastewaters, to produce effluent which has both low biological oxygen demand (BOD), low chemical oxygen demand (COD), and low total suspended solids (TSS), unfortunately, conventionally employed biological treatment systems depend on a temperature range favorable to biological activity. Available literature on biological treatment suggests that biological activity virtually ceases below about 8° C. Large sums of money are required to heat lagoons in the winter months in many parts of the country to achieve lagoon temperatures at which biological activity can proceed.

Often, lagoon efficiency suffers due to concentration build up during winter months when microorganisms are less active. In some cases, because of reduced lagoon efficiency the rate of discharge of effluents into the lagoons must be decreased during winter months.

With increased concern as to minimization of the problems arising from pollution, biological processes are being employed in industry in an increasing amount, and a large amount of activity in research and development is occurring presently to develop new microbial strains capable of use in wastewater treatment industrially, municipally and domestically. Even with this increased activity in investigating and developing strains of microorganisms to solve particular waste removal problems, treatment at low temperatures still remains a problem.

SUMMARY OF THE INVENTION

Accordingly, an object of this invention is to provide a microorganism which is effective in degrading phenolics in wastewater at low temperatures.

A further object of this invention is to provide a treatment for industrial, municipal and domestic wastewaters utilizing a novel mutant of *Pseudomonas putida*, alone or in combination with other microorganisms, to degrade and remove phenolics from wastewaters.

Another object of this invention is to provide a biological process for removing phenolics from wastewater using a novel mutant strain of *Pseudomonas putida* in conjunction with a specific combination of other microorganisms described hereinafter, particularly at low temperatures.

An even further object of this invention is to provide a biological treatment process effective even at low temperatures for treating industrial, municipal and domestic wastewaters containing phenolics and rendering such wastewaters suitable for discharge into the biosphere, thereby minimizing problems of pollution.

An additional object of this invention is to provide a novel mutant strain of *Pseudomonas putida*.

In one embodiment of this invention, this invention provides a process for treating wastewater containing phenolics, which comprises treating wastewater containing phenolics with a microorganism of the strain *Pseudomonas putida* CB-173.

In another embodiment of this invention, this invention provides a novel strain of the species *Pseudomonas putida* CB-173 having the characteristics described below.

DETAILED DESCRIPTION OF THE INVENTION

The novel mutant *Pseudomonas putida* CB-173 (hereinafter "mutant strain") was produced by mutation of a parent strain of *Pseudomonas putida* isolated from a wastewater lagoon at a large textile chemical manufacturing plant located in Wellford, S.C.

This novel mutant has been found to be capable of degrading phenolics at temperatures as low as 4° C. and lower at a rate faster than the type strains of *Pseudomonas putida*, both biotype A and biotype B, and has the characteristics described below.

The mutant strain *Pseudomonas putida* CB-173 is a gram negative, non-spore forming rod. The cells are rod shaped, sometimes curved which have one to four polar flagella and the cells are motile. Approximately 10–20% of the cells are joined in filaments of two cells each.

The mutant strain is a strict aerobe which produces a diffusible yellow-green fluorescent pigment. On metabolism in the presence of nitrate, the mutant strain does not produce nitrate reductase. The mutant strain is "catalase positive" and weakly positive for oxidase. There is no gelatin liquefaction by the mutant strain in eight days. The mutant strain utilizes various amines for growth, but does not use the alcohol m-inositol. A suitable growth temperature range is from about 1° C. to about 35° C. with optimal growth occurring at 25°–30° C. No growth is observed in two days at 37° C.

Other cultural characteristics and colonial morphology of this mutant strain are shown in Tables 1–6 below.

In the following tables, *Pseudomonas putida* strains, biotype A (ATCC 12633) and biotype B (ATCC 17536), were employed as known type strains for characterization purposes.

TABLE 1

MICROSCOPIC MORPHOLOGY

| CHARACTERISTIC | Biotype A** | Biotype B** | CB-173 |
|---|---|---|---|
| Cell Size* | | | |
| Length | 2.0–4.0 μm | 2.0–4.0 μm | 2.0–4.0 μm |
| Width | 0.7–1.1 μm | 0.7–1.1 μm | 0.7–1.1 μm |
| Gram Reaction | Negative Rod | Negative Rod | Negative |

TABLE 1-continued

MICROSCOPIC MORPHOLOGY

| CHARACTERISTIC | Biotype A** | Biotype B** | STRAIN CB-173 |
|---|---|---|---|
| | | | Rod |

*Wet mounts of 20-hour cultures viewed under phase contrast (1000X). Sizes given in micrometers.
**Data from Bergey's Manual of Determinative Bacteriology, 8th Ed., The Williams and Wilkins Co., Baltimore (1974).

TABLE 2

COLONIAL CHARACTERISTICS OF PSEUDOMONAS PUTIDA CB-173 AFTER 24 HOURS AT 30° C.

Nutrient Agar
Circular, convex colonies with smooth, shiny surface and entire edge. Colonies, 1.25–1.75 mm in size, are transluscent with slight cream color and produce a greenish-yellow fluorescent pigment

Hecktoen Enteric Agar
Circular, convex colonies with smooth, shiny surface and entire edge. Colonies are transluscent to opaque with green color; 0.6–0.75 mm in diameter. No pigment is produced.

Plate Count Agar
Circular, convex colonies with smooth, shiny surface and entire edge. Colonies, 1.25–1.5 mm in diameter, are transluscent with slight cream color and produce a greenish-yellow fluorescent pigment.

Trypticase Soy Agar
Circular, convex colonies with smooth, shiny surface and entire edge. Colonies are transparent with slight cream color and produce a greenish-yellow fluorescent pigment. Colonies are 1.25–2 mm in diameter.

NOTE: Plate Count Agar and Hecktoen Enteric Agar are products of Difco Laboratories. Nutrient Agar and Trypticase Soy Agar are products of Baltimore Biological Laboratories.

TABLE 3

UTILIZATION OF CARBON-CONTAINING COMPOUNDS FOR GROWTH

| COMPOUND* | Biotype A | Biotype B | CB173 |
|---|---|---|---|
| Carbohydrates (& sugar derivatives) | | | |
| α-Cellulose | − | − | − |
| L-Arabinose | − | − | − |
| D-Trehalose | − | − | − |
| D-Cellobiose | − | − | − |
| Xylose | + | − | − |
| D-Galactose | − | + | − |
| D-Mannose | − | + | − |
| D-Lactose | − | − | − |
| Alcohols | | | |
| meso-Inositol | − | − | − |
| 1-Butanol | + | + | + |
| 1-Propanol | + | + | + |
| Aliphatic Amino Acids | | | |
| L-Alanine | + | + | + |
| β-Alanine | + | + | + |
| D-Alanine | + | + | + |
| L-Arginine | + | + | + |
| L-Valine | + | + | − |
| L-Asparagine | + | + | + |
| L-Cystine | + | ± | ± |
| L-Leucine | + | + | − |
| Glycine | + | + | − |
| Pyridine | − | − | − |
| Cytosine | ± | − | − |
| D-Aspartic Acid | + | ± | ± |
| Amino Acids and Related Compounds Containing A Ring Structure | | | |
| D-Histidine | + | ± | + |
| L-Proline | + | + | + |
| L-Tyrosine | + | + | + |
| Tryptophan | − | + | − |
| Fatty Acids | | | |
| Heptanoic Acid | + | + | − |
| Dicarboxylic Acids | | | |
| Malonic | + | + | − |
| Succinic | + | ± | − |
| Saccharic | + | + | ± |
| Maleic | + | + | ± |
| Oxalic | + | ± | ± |
| Hydroxy Acids | | | |
| Malic | + | + | + |
| D-Glyceric | − | − | − |
| Miscellaneous Acids | | | |
| Pyruvic | + | + | + |
| Citric | + | + | + |
| Nicotinic | + | − | − |
| Miscellaneous Compounds | | | |
| Igepal*** CO 660 | − | ± | + |
| Igepal*** CO 520 | − | − | − |
| EDTA | − | − | − |
| m-Cresol (100 mg/l) | − | − | − |
| Triacetin | − | − | − |

*Compound added at 0.5% to minimal salt medium (Roy Curtiss, III, J. Bact., 89, pages 28–40 (1965)).
** + indicates growth greater than that of blank;
 − indicates growth less than that of blank;
 ± indicates growth approximately equal to blank or weak growth, after seven days at 30° C.
***Trade name for a non-ionic nonyl phenol-ethylene oxide condensate produced by GAF.

TABLE 4

UTILIZATION OF NITROGENOUS COMPOUNDS AS SOLE NITROGEN SOURCE

| COMPOUND* | Biotype A | Biotype B | CB-173 |
|---|---|---|---|
| NH₄Cl | + | + | + |
| KNO₃ | + | + | − |
| D-Alanine | + | + | + |
| L-Aspartic Acid | − | − | − |
| L-Tyrosine | + | + | + |
| Betaine | + | + | + |
| Tryptophan | ± | + | + |
| No Nitrogen Compound | − | − | − |

NOTE: Fluorescent yellow-green pigment produced on betaine by Biotype A only, not by Biotype B and CB-173.
*Nitrogenous compound added at 0.5% to minimal salts medium (Curtiss (1965)), but without NH₄Cl and NH₄NO₃, and agar, but with 0.5 g Na Citrate/100 ml as a carbon source.
** + indicates growth greater than that of blank;
 − indicates growth less than that of blank;
 ± indicates growth approximately equal to blank or weak growth after two days at room temperature in tubes aerated on a shaker.

TABLE 5

CULTURE GROWTH IN PRESENCE OF HEAVY METALS

| HEAVY METAL* | CONCENTRATION | Biotype A | Biotype B | CB-173 |
|---|---|---|---|---|
| CdCl₂ | 200 mg/l | + | + | − |

TABLE 5-continued
CULTURE GROWTH IN PRESENCE OF HEAVY METALS

| HEAVY METAL* | CONCEN-TRATION | STRAIN RESPONSE | | |
|---|---|---|---|---|
| | | Biotype A | Biotype B | CB-173 |
| | 20 mg/l | + | + | ± |
| | 2 mg/l | + | + | ± |
| $CoCl_2$ | 200 mg/l | − | − | − |
| | 20 mg/l | + | + | + |
| | 2 mg/l | + | + | + |
| $Na_2HAsO_4$ | 200 mg/l | + | + | + |
| | 20 mg/l | + | + | + |
| | 2 mg/l | + | + | + |
| $HgCl_2$ | 400 mg/l | − | − | − |
| | 200 mg/l | − | − | − |
| | 20 mg/l | − | − | − |
| | 2 mg/l | + | + | − |
| Control No heavy metal | | + | + | + |

*Heavy metal added to minimal salts medium containing (0.5%) D-glucose (Curtiss (1965)). CB-173 does not grow as readily in this medium as Biotype A and Biotype B. Growth was scored by comparison with the control.
+ indicates growth (no inhibition);
− indicates no growth (inhibition); and
± indicates weak growth.

TABLE 6
RESISTANCE TO ANTIBIOTICS

| ANTIBIOTIC | STRAIN GROWTH RESPONSE | | |
|---|---|---|---|
| | Biotype A | Biotype B | CB-173 |
| Amakacin | S | S | S |
| Ampicillin | R | R | R |
| Carbenicillin | R | R | R |
| Cefamandol | R | R | R |
| Cephalothin | R | R | R |
| Chloramphenicol | R | R | I |
| Gentamycin | S | S | S |
| Kanamycin | S | S | S |
| Streptomycin | I | S | S |
| Tetracycline | I | I | I |
| Tobramycin | S | S | S |

Growth response on Pfizer Antimicrobial Susceptibility Disks; Pfizer, Inc.; Scored:
S = sensitive to antibiotic;
R = resistant to antibiotic;
I = intermediate.

On the basis of the morphological, cultural, and physiological characteristics set forth above, the mutant strain has been identified as a member of the species, Pseudomonas putida and has been designated herein as Pseudomonas putida CB-173.

A culture of the mutant strain has been deposited in the American Type Culture Collection and has received an accession number, ATCC-31800.

As indicated above, the parent strain from which the mutant strain was developed was isolated from a wastewater lagoon of a textile chemical manufacturing plant in Welford, S.C. This wastewater was streaked onto a nutrient supplemented sole source of carbon agar (NS-SSC). The composition of the media used is set forth in Table 7 below:

TABLE 7
COMPOSITION OF NUTRIENT-SUPPLEMENTED SOLE SOURCE OF CARBON AGAR

| Compound | Quantity |
|---|---|
| Nutrient Broth,* prepared | 20 ml/l |
| $(NH_4)_2SO_4$ | 2 g/l |
| $Na_2HPO_4$ | 1 g/l |

TABLE 7-continued
COMPOSITION OF NUTRIENT-SUPPLEMENTED SOLE SOURCE OF CARBON AGAR

| Compound | Quantity |
|---|---|
| Phenol-liquefied, approx. 90% | 1.05 ml/l |

Tap water used to provide trace minerals
*Product of Baltimore Biological Laboratories After four days incubation at 4° C., growth appeared. The predominant organism was mutated by exposure to ethyl methane sulfonate (EMS) at 0.01% during the growth phase. 10 ml of a 20-hour culture of the organism grown in nutrient broth plus 250 mg/l phenol plus 0.1 ml of 1% solution of EMS were incubated 30 minutes at 4° C. The culture was spun down, the supernatant decanted, and the cells were resuspended in 10 ml of NS-SSC media and incubated overnight at 4° C. This procedure of centrifugation, resuspension in fresh media, and incubation was repeated twice. The final culture was streaked onto NS-SSC agar plates and four colony types were selected. All four mutants were tested for growth in NS-SSC flasks with increasing amounts of phenol and for growth in NS-SSC media where phenol was replaced by the surfactant Igepal CO 660. One organism was selected for its superior utilization of phenol and Igepal CO 660 at 4° C. This organism is herein referred to as the mutant Pseudomonas putida CB-173.

The following data demonstrates the ability of Pseudomonas putida CB-173 to degrade the surfactant Igepal CO 660 at 4° C. A reverse flow or "upflow" biotower was used. The biotower comprised a cylindrical column filled with Pall rings made of plastic resin. The liquid wastewater or solution to be tested and air were introduced into the bottom with a concurrent flow of liquid and air up through the column where it drained off at the top.

A slime layer of Pseudomonas putida CB-173 was built up on the Pall rings in the biotower by recycling a solution of 2% whey, 0.5% disodium phosphate and 0.1% $(NH_4)_2SO_4$ in water inoculated with the Pseudomonas putida CB-173. After the slime layer had developed, the solution was replaced with a test solution of approximately 3500 mg/l Igepal CO 660 supplemented with 1 g/l ammonium sulfate and 0.5 g/l disodium phosphate. This was a batch test whereby the solution was not continuously flowed in and decanted off but stayed in the biotower. The Pseudomonas putida CB-173 was active at 4° C. in reducing the level of Igepal CO 660 as shown by the results in Table 8 below:

TABLE 8
RATE OF REDUCTION WAS 180 mg IGEPAL CO 660/hr/ft³ OF REACTOR

| Time hrs. | pH | Temperature (°C.) | Concentration of Igepal CO 660 (mg/l) | % Reduction |
|---|---|---|---|---|
| 0 | 7.75 | 4 | 3465 | — |
| 52 | 7.80 | 4 | 2467 | 29% |
| 74 | — | 4 | 2100 | 40% |
| 98 | — | 4 | 1617 | 53% |
| 165 | 7.50 | 4 | 1050 | 70% |

The method of analysis of Igepal CO 660 used was an analysis for non-ionics described by D.G. Stevenson, "The Adsorptiometric Determination of a Non-Ionic Detergent," Dept. of Atomic Energy, Atomic Weapons Research Establishment, Aldermaston,Berkshire, England (August, 1954).

When compared to sewage seed from the Roanoke Sewage Treatment Plant, Roanoke, Va., respirometer studies showed the mutant *Pseudomonas putida* CB-173 to have much greater activity in nutrient broth substrate at 11°–13° C. In addition, the mutant *Pseudomonas putida* CB-173 was able to break down 350 mg/l phenol to less than a detectable level in five days at this temperature. The results are set forth in Table 9 below.

TABLE 9

| Hours After Inoculation | mg O₂ Consumed by Sewage, seed in Nutrient Broth | mg O₂ Consumed by CB-173 in CB-173 in Nutrient Broth | mg O₂ Consumed by CB-173 in Nutrient Broth and Phenol | Phenol* Concentration in Culture of CB-173 in Broth and Phenol (mg/l) |
|---|---|---|---|---|
| 8 | 16 | 18 | 15 | 350 |
| 24 | 18 | 97 | 47 | — |
| 48 | 20 | 393 | 272 | — |
| 64 | 21 | 443 | 421 | — |
| 80 | 27 | 475 | 569 | — |
| 96 | 38 | 503 | 698 | — |
| 112 | 44 | 529 | 793 | — |
| 120 | 45 | 532 | 797 | <1 |

*Phenol was assayed by an adaptation of the direct photometric method. Standard Methods for the Examination of Water and Wastewater, 14th Edition, 1975, p. 580.

Respirometer results were taken automatically from stirred one-liter reactors in an electrolytic respirometer produced by Oceanography International Corp. with temperature control and automatic printout.

A synergistic effect was noted when the combination of a mixed microorganism culture containing: Micrococcus species strain, Bacillus species strain and two Pseudomonas species strains were used with the *Pseudomonas putida* CB-173. Table 10 below shows the increased activity. Effort was made to have the inoculum in both reactors contain approximately the same number of cells.

TABLE 10

| Hrs. | mg O₂ Consumed by CB-173 | mg O₂ Consumed by Microorganism Combination and CB-173 | Phenol Concentration with CB-173 (mg/l) | Phenol Concentration with Microorganism Combination and CB-173 (mg/l) |
|---|---|---|---|---|
| 15 | 2.7 | 1.2 | — | — |
| 25 | 49 | 41 | — | — |
| 35 | 134 | 143 | — | — |
| 50 | 276 | 360 | 300 | 160 |
| 70 | 454 | 570 | 130 | <1 |

The substrate was nutrient broth, Baltimore Biological Laboratories, with 350 mg/l phenol. Each inoculum was from 24-hour shake flask cultures. Total amount of each inoculum was the same. Phenol concentration was measured at 50 hours and 70 hours to determine phenol degradation degree. Increased phenol degradation rates are seen in wastes lower in competitive carbon sources.

The effectiveness of the type strains of *Pseudomonas putida* versus the mutant *Pseudomonas putida* CB-173 in degrading phenol at various temperatures is demonstrated in Table 11 below. *Pseudomonas putida* CB-173 grew better at 4° C. than the type strains of *Pseudomonas putida*, and *Pseudomonas putida* CB-173 degraded phenol at a much greater rate than the *Pseudomonas putida* type strains at all temperatures, especially at 4° C.

TABLE 11

| Temp. | Organism | Phenol Conc. (mg/l) | | | | |
|---|---|---|---|---|---|---|
| | | Day 3 | Day 5 | Day 6 | Day 9 | Day 10 |
| 4° C. | P. putida-Biotype A | 280 | 280 | 280 | 275 | 270 |
| | P. putida-Biotype B | 280 | 280 | 280 | 265 | 250 |
| | P. putida-CB-173 | 280 | 150 | 10 | <1 | <1 |

| | | % Transmittance of Culture to Indicate Growth | | | | |
|---|---|---|---|---|---|---|
| 4° C. | P. putida-Biotype A | 100 | — | 91 | 56 | — |
| | P. putida-Biotype B | 95 | — | 45 | 52 | — |
| | P. putida-CB-173 | 92 | — | 41 | 13 | — |

| | | Phenol Conc. (mg/l) | | |
|---|---|---|---|---|
| | | Day 1 (24 hrs.) | Day 2 (48 hrs.) | Day 3 |
| 15° C. | P. putida-Biotype A | 280 | 280 | 270 |
| | P. putida-Biotype B | 280 | 280 | 240 |
| | P. putida-CB-173 | 250 | 5 | <1 |

| | | % Transmittance of Culture to Indicate Growth | |
|---|---|---|---|
| | | Day 1 (24 hrs.) | Day 2 (48 hrs.) |
| 15° C. | P. putida-Biotype A | 99 | —* |
| | P. putida-Biotype B | 99 | —* |
| | P. putida-CB-173 | 96 | —* |

| | | Phenol Conc. (mg/l) | |
|---|---|---|---|
| | | Day 1 (24 hrs.) | Day 2 (48 hrs.) |
| 30° C. | P. putida-Biotype A | 280 | 280 |
| | P. putida-Biotype B | 280 | 280 |
| | P. putida-CB-173 | 280 | 5 |

| | | % Transmittance of Culture to Indicate Growth | |
|---|---|---|---|
| | | Day 1 (24 hrs.) | Day 2 (48 hrs.) |
| 30° C. | P. putida-Biotype A | 53 | 40 |
| | P. putida-Biotype B | 44 | 40 |
| | P. putida-CB-173 | 45 | 41 |

The substrate was nutrient broth, Baltimore Biological Laboratories, with 300 mg/l phenol. Media was prechilled and inoculated with 0.05 ml of a 24-hour culture of the indicated microorganism strain. Flasks were shaken at constant speed and maintained at the temperatures indicated.
*Turbid, indicating abundant growth, measurement unnecessary.

The *Pseudomonas putida* CB-173 can be employed alone or in combination with other microorganisms conventionally used in microbiological treatment of wastes. This invention also includes the use of any variants of *Pseudomonas putida* CB-173 alone or in combination.

The mutant strain *Pseudomonas putida* CB-173 of this invention can be cultured in wastewater from any type of industrial, municipal or domestic source containing a wide variety of phenolics and like materials either using a batch process, a semi-continuous process or a continuous process, and such is cultured for a time sufficient to degrade the phenolics and like materials present in the wastewater and remove them or break them down into components capable of being degraded by other organisms normally found in biological wastewater treatment systems.

The mutant strain of this invention can be employed in trickling filter systems, in carbon adsorption systems, in activated sludge treatment systems, in outdoor lagoons or pools etc. Basically, all that is necessary is for the microorganism to be placed in a situation of contact with the wastewater. In order to degrade the material present in the wastewater, the organisms can be cultured under conditions of about 1° C. to about 35° C., more generally about 10° C. to about 30° C. Low temperature conditions of about 1° to about 10° C., particularly about 4° to about 10° C., can also be used with the microorganism strain with unexpected rates of degradation being obtained in comparison with other organisms, including other *Pseudomonas putida* strains, within this temperature range. Desirably, the pH is maintained in a range of about 6.0 to about 8.5, preferably 7.0 to 7.5. Control of the pH can be by monitoring of the system and an addition of appropriate pH adjusting materials to achieve this pH range.

The culturing is conducted basically under aerobic conditions of a dissolved oxygen concentration of about 0.5 mg/l or more, preferably about 2 mg/l or more. These conditions can be simply achieved in any manner conventional in the art and appropriate in the treatment system design being employed. For example, air can be bubbled into the system, the system can be agitated, a trickling system can be employed, etc.

The wastewater to be subjected to the process of this invention may contain sufficient nitrogen and phosphorus for culturing without the need for any additional source of nitrogen or phosphorus being added. However, in the event the wastewater is deficient in these two components, suitable available nitrogen sources, such as ammonia or an ammonium salt, e.g., ammonium sulfate, can be added to achieve an available nitrogen content of at least about 5 mg/l or more per 100 mg/l $BOD_5$. Similarly, phosphorus can be supplemented, if necessary, by addition of orthophosphates, e.g., sodium phosphate, to achieve a phosphorus level in the wastewater of about 1 mg/l or more per 100 mg/l $BOD_5$. In general, the treatment is conducted for a sufficient time to achieve the reduction in levels of phenolics and like materials and, in general, about 24 hours to 4 weeks or longer, although this will depend upon the temperature of culturing, the concentration of these materials in the wastewater and the volume to be treated and other factors, has been found to be suitable.

In the above manner, phenolics and like materials which have been previously considered in the art to be difficultly degradable or non-biodegradable and which are especially slow or hard to degrade at low temperatures, as well as other organic compounds which might be present in wastewater systems, can be advantageously treated to provide treated wastewater suitable for discharge after any additional conventional processing such as settling, chlorination, etc., into rivers and streams.

As can be seen from an examination of the examples given herein, the mutant strain *Pseudomonas putida* CB-173 provides advantageous results in degrading phenolics and the like, particularly at low temperatures.

The following description is not to be considered to be limiting, rather merely exemplary of the types of phenolics to which this invention is applicable and which can be degraded in accordance with the method of this invention. Suitable examples of phenolics and like materials which can be degraded include catechols and substituted catechols, phenols and substituted phenols including monophenols, ortho-diphenols, etc., and dihydroxyphenylalanines as well as certain phenolic based nonionic materials.

In order to further demonstrate the effectiveness of the mutant strain *Pseudomonas putida* CB-173, the following examples are given as exemplary of the invention but without intending to limit the same. Unless otherwise indicated herein, all parts, percents, ratios and the like are by weight.

EXAMPLE 1

A field study was conducted on wastewater at the plant of a food processing company in Eastern Pennsylvania during the winter months of January through March. The culture was added to the wastewater holding lagoon and the normal parameters of degradation compared to those obtained the previous year without the culture containing *Pseudomonas putida* CB-173.

TABLE 12

|  | First Year Without CB-173 | Second Year With CB-173 |
|---|---|---|
| Ave. Raw BOD | 1800 | 1125 |
| Ave. Final BOD | 98 | 12 |
| % BOD Reduction | 94.6% | 98.9% |
| Ave. Raw TSS | 1006 | 1047 |
| Ave. Final TSS | 65 | 34 |
| % TSS Reduction | 93.5% | 96.8% |
| Ave. Mixed Liquid Temp. (°C.) | 13.5 | 10.5 |
| Lowest Mixed Liquor Temp. (°C.) | 9.5 | 7 |

EXAMPLE 2

In a further field study presently in progress at a phenol resin plant, it was found that utilization of the *Pseudomonas putida* CB-173 of this invention at low temperatures generally encountered during the winter months in that area allowed a reduction in the amount of steam required for lagoon heating to achieve normal lagoon operation, with an estimated savings in energy cost thus far in mid-January of about $2500 per lagoon.

While the invention has been described in detail and with reference to specific embodiments thereof, it will be apparent to one skilled in the art that various changes and modifications can be made therein without departing from the spirit and scope thereof.

What is claimed is:

1. A microorganism *Pseudomonas putida* CB-173 having the identifying characteristics of ATCC-31800, said microorganism being capable upon culturing in wastewater containing phenolics of utilizing such as an assimilable source of carbon.

* * * * *